(12) United States Patent
Kondaji et al.

(10) Patent No.: US 12,461,084 B2
(45) Date of Patent: Nov. 4, 2025

(54) SOIL ANALYSIS APPARATUS

(71) Applicant: Klonec Automation Systems Pvt. Ltd., Karnataka (IN)

(72) Inventors: Sandeep Nagesh Kondaji, Mangalore Karnataka (IN); Vishnuprasada V Bhat, Karnataka (IN); Vignesh Shanbaug, Karnataka (IN); Rakesh Joshi, Karnataka (IN)

(73) Assignee: Klonec Automation Systems Pvt. Ltd., Karnataka (IN)

( * ) Notice: Subject to any disclaimer, the term of this patent is extended or adjusted under 35 U.S.C. 154(b) by 941 days.

(21) Appl. No.: 17/634,020

(22) PCT Filed: Aug. 9, 2020

(86) PCT No.: PCT/IN2020/050702
§ 371 (c)(1),
(2) Date: Feb. 9, 2022

(87) PCT Pub. No.: WO2021/028942
PCT Pub. Date: Feb. 18, 2021

(65) Prior Publication Data
US 2023/0088751 A1 Mar. 23, 2023

(51) Int. Cl.
*G01N 33/24* (2006.01)
*G01N 21/77* (2006.01)
*G01N 35/00* (2006.01)
*G01N 35/10* (2006.01)

(52) U.S. Cl.
CPC ............. *G01N 33/24* (2013.01); *G01N 21/77* (2013.01); *G01N 35/0099* (2013.01); *G01N 35/1002* (2013.01)

(58) Field of Classification Search
CPC ..... G01N 33/24; G01N 35/0099; G01N 21/77
See application file for complete search history.

*Primary Examiner* — Natalia Levkovich
(74) *Attorney, Agent, or Firm* — Amster, Rothstein & Ebenstein LLP

(57) ABSTRACT

The present disclosure relates to the field of a soil analysis apparatus. The apparatus comprises an enclosure, a provision for introducing a soil solution to be analyse, reservoir, a plurality of storage containers to store reagent solution, a frame member having a plurality of apertures to support a plurality of dispensing pipes, at least one pump coupled to a control unit and in fluid communication with the storage containers and the reservoir to dispense a predetermined quantity of the reagent and the soil solution into a receptacle. Further, at least one robotic arm assembly coupled with a control unit, traverses within the enclosure to receive the soil solution and reagents solution and to perform a mixing operation to obtain a mixture of soil solution and reagent solution. Further, an image capturing unit is present to capture images of the mixture to analyse the soil properties and nutrient content.

15 Claims, 6 Drawing Sheets

SOIL ANALYSIS APPARATUS

CROSS-REFERENCE TO RELATED APPLICATIONS

This application is a U.S. national stage entry under 35 U.S.C. § 371 of PCT International Patent Application No. PCT/IN2020/050702, filed Aug. 9, 2020, which claims the benefit of priority to Indian Provisional Patent Application No. 201941032268, filed on 9 Aug. 2019, the entire contents of each of which are hereby incorporated herein by reference.

TECHNICAL FIELD

The present disclosure relates in general to a testing apparatus. Particularly but not exclusively the present disclosure relates to soil analysis apparatus. Further embodiments of the disclosure disclose, a portable apparatus for testing and analysing soil properties.

BACKGROUND

In general, soil testing is performed for several purposes, one of the main reasons is to determine concentrations of plant nutrients and soil fertility. Based on the determined concentrations, appropriate suggestions are provided for use of type of fertilizers and other growth stimulating agents. Typically, a number of soil samples are collected in a required amount from a site/location carried away to external labs. Further, these samples are appropriately labelled and tracked so that the later obtained test results can accurately be designated to the location from which the soil samples were taken. Testing the soil sample in external laboratories is time consuming and requires big infrastructure with trained professionals. Additionally, properties of the soil sample change due to variations in the conditions during the transportation of the soil from one place to another.

With ongoing efforts, many automated soil collection devices have been developed that analyze soil one-the-go. However, the conventional automated soil analyzing devices comprise large attachments and components that required to be pulled through the field or soil that is to be tested. Moreover, arranging such attachments is often time consuming and extremely expensive. Further, arrangement of such complex attachments of device requires skill and technique making it difficult and laborious to obtain accurate results.

Also, these conventional devices are huge with complex design, thereby increasing manufacture and maintenances cost apparatus. This may further restrict frequent testing of the soil to understand the nature of soil that is dynamic and is influenced by a variety of environmental and ecological factors. Therefore, a need exists for an apparatus for testing and analysing soil properties to seek to mitigate one or more of the above disadvantages.

SUMMARY

The one or more shortcomings of the prior art are overcome by a soil analysis apparatus as claimed and additional advantages are provided through the provisions as claimed in the present disclosure. Other embodiments and aspects of the disclosure are described in detail herein.

The present disclosure provides the soil analysis apparatus comprising an enclosure, a provision, at least one reservoir, receive and store the soil solution, a frame member at least one pump, at least one robotic arm assembly, a control unit and an image capturing unit. The apparatus includes the enclosure that defines a platform. The provision defined in an upper wall of the enclosure for introducing a soil solution of the soil to be analysed. Further, the reservoir is enclosed in the enclosure to receive and store the soil solution. The plurality of storage containers is supported by the enclosure, each configured to store at least one reagent solution. The frame member is supported within the enclosure that is defined with a plurality of apertures. Each of the apertures are configured to support at least one of a plurality of dispensing pipes, such that at least a portion of the frame member is configured as a reflective surface. Further, at least one pump is in fluid communication with each of the plurality of the storage containers, the reservoir and the plurality of dispensing pipes to dispense a predetermined quantity of the reagent solution and the soil solution through a respective aperture of the plurality of apertures into a receptacle. The robotic arm assembly mounted within the enclosure is configured to hold the receptacle. Further, the control unit is communicatively coupled to the robotic assembly and at least one pump. The control unit is configured to actuate the pump to supply the predetermined quantity of the reagent solution and the soil solution into the receptacle through the respective aperture of the plurality of apertures of the frame member. Furthermore, the control unit is configured to selectively actuate the robotic arm assembly to traverse the receptacle within the enclosure to receive the soil solution and reagents solution dispensed through the plurality of the dispensing pipes and to perform a mixing operation to obtain a mixture of soil solution and reagent solution. The receptacle is positioned about the reflective surface. The image capturing unit is positioned within the enclosure. The image capturing unit is configured to capture images of the mixture of the soil solution and the reagent solution in the receptacle against the reflective surfaces.

In an embodiment, the apparatus comprises a user interface unit coupled with the control unit to receive inputs and displays outputs based the soil analysis.

In an embodiment, the apparatus comprises a residue collection unit supported in the enclosure to receive the mixture of soil solution and reagent solution. In an embodiment, the residue collection unit includes a filter to separate a residue from the mixture of the soil solution and the reagent solution. In an embodiment, the robotic assembly dispenses the mixture of the soil solution and the reagent solution in the receptacle into the residue collection unit.

In another embodiment, the apparatus comprises an auxiliary reservoir to store distilled water. In yet another embodiment the control unit is coupled to the robotic arm assembly to actuate the robotic assembly to receive a predetermined quantity of distilled water to clean the receptacle before receiving the soil solution.

The apparatus further comprises a light source positioned in the enclosure to illuminate the receptacle.

In an embodiment, the robotic assembly comprises a stand mounted within the enclosure. A robotic arm is coupled to the stand, to hold the receptacle. Further, a rotary unit is secured to the stand for pivoting and rotating the robotic arm about a first axis and a second axis respectively, such that the second axis coincides with a vertical axis of the robotic arm.

In an embodiment, the reflective surfaces receives light from the light source and reflects the light to illuminate the receptacle to allow the image capturing to capture the set of images of the mixture of the soil solution and the reagent solution to determine an RGB value and a nutrition content of soil.

In an embodiment, at least one pump supplies one or more reagents external to the apparatus via an auxiliary duct to facilitate preparation of the soil solution.

In an embodiment, the image capturing unit is secured on the robotic arm assembly or mounted to the upper wall of the enclosure to capture a set of images of the receptacle.

In an embodiment, the apparatus comprises a data repository coupled with the image capturing unit, wherein the data repository is configured to store one or more set of images captured by the image capturing unit and standard calibration images.

In an embodiment, the control unit comprises a processor and a memory communicatively coupled to the processor. The memory stores processor-executable instructions, which, on execution, causes the processor to receive one or more command signals associated with the user inputs from the user interface unit. Further, robotic arm assembly is actuated to traverse within the enclosure. Subsequently, at least one pump is actuated to supply the predetermined quantity of soil solution from the reservoir and one or more reagent solution from each of the plurality of storage containers via dispensing pipes. In an embodiment, the robotic arm assembly is actuated to perform mixing operation to obtain the mixture of soil solution and reagent solution and position the receptacle about the reflective surface. Further, one or more command signals are generated to the light source for illuminating the receptacle positioned about the reflective surface. Additionally, one or more command signals are generated to the image capturing unit for capturing at least one image of the receptacle against the reflective surfaces. In an embodiment, at least one image from the image capturing unit is received and one or more parameters are determined including an RGB value and nutrient content by comparing at least one image received from the image capturing unit with standard calibrated images stored in the memory unit. Further, one or more reports are generated including information associated with the RGB values, nutrient content, one or more recommendations of follow-up test procedures, time to be conducted and analysis opinion provided based on RGB value and the nutrient content thus determined. Furthermore, one or more reports are displayed via the user interface unit.

In an embodiment, the apparatus comprises a power source to supply power to the control, pumps, rotary unit image capturing unit, and the light source.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
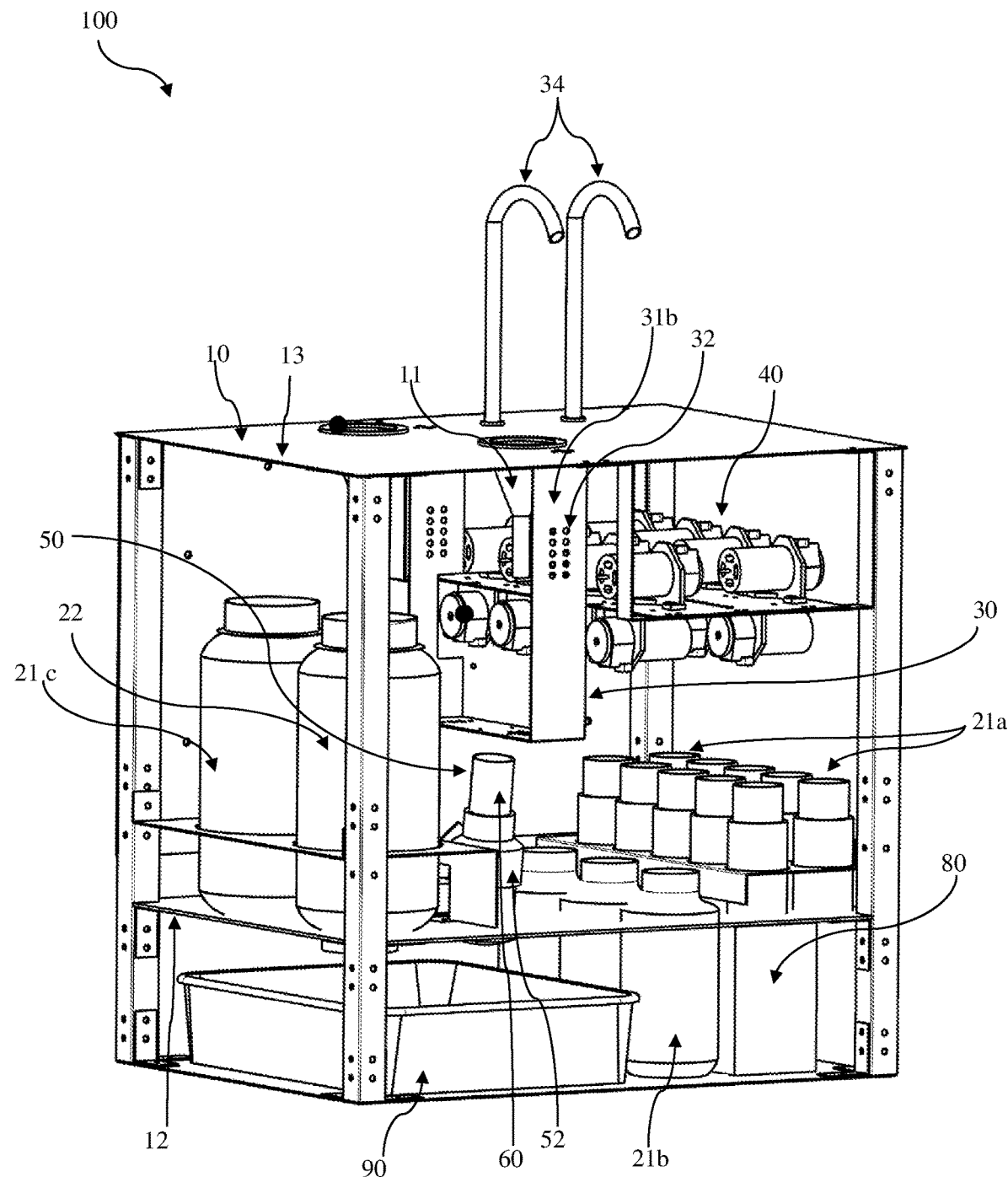
FIG. 1 illustrates a perspective view a soil analysis apparatus, in accordance with an embodiment of the present disclosure.
Figure 2:
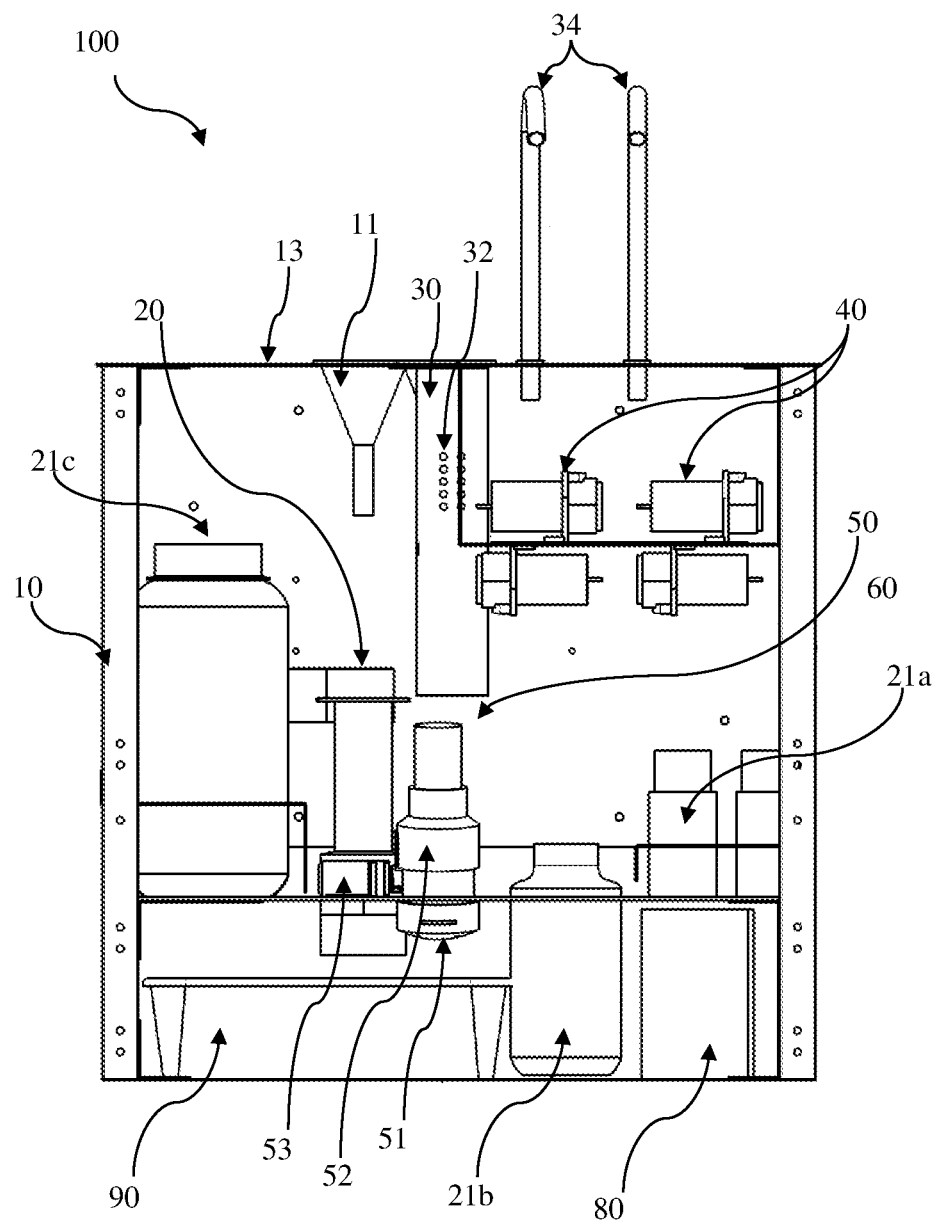
FIG. 2 illustrates side view of the soil analysis apparatus of FIG. 1.
Figure 3:
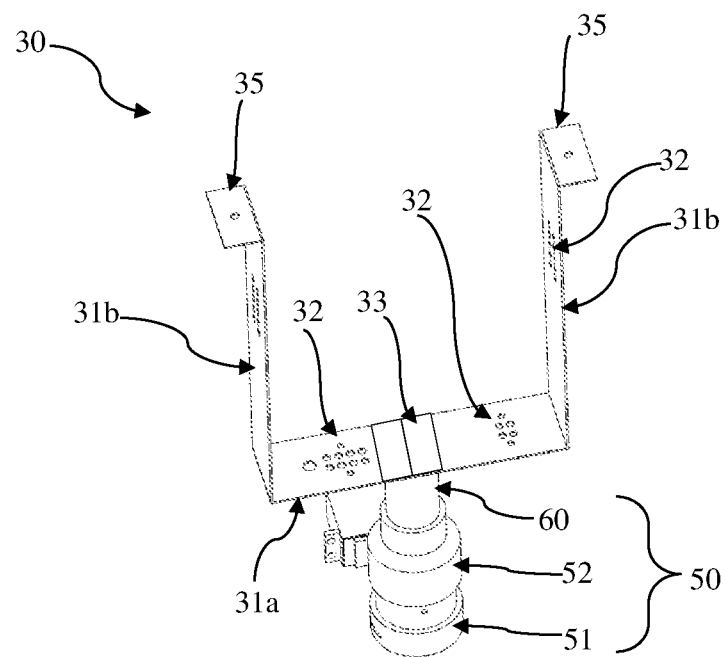
FIG. 3 illustrates a perspective view of a frame member and a robotic arm assembly, in accordance with an embodiment of the present disclosure.
Figure 4:
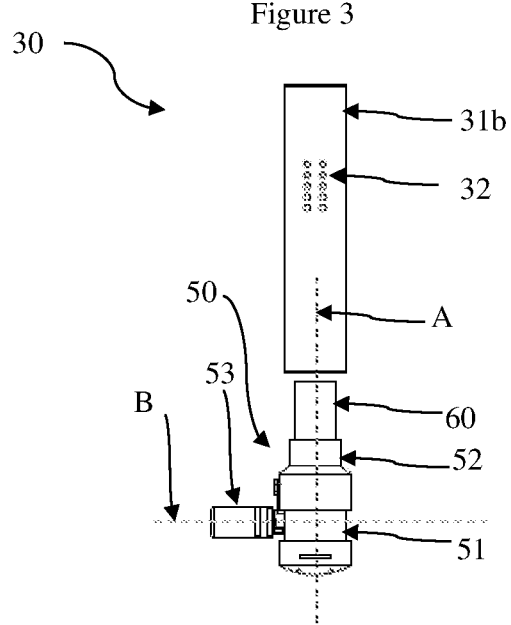
FIG. 4 illustrates a side view of the frame member and the robotic arm assembly, in accordance with an embodiment of the present disclosure.

The figures depict embodiments of the disclosure for purposes of illustration only. One skilled in the art will readily recognize from the following description that alternative embodiments of the apparatus and methods illustrated herein may be employed without departing from the principles of the disclosure described herein

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiments thereof have been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that an apparatus or method that comprises a list of components or steps does not include only those components or steps but may include other components or steps not expressly listed or inherent to such setup or device or process. In other words, one or more elements in a system or apparatus proceeded by "comprises . . . a" does not, without more constraints, preclude the existence of other elements or additional elements in the system or apparatus.

Embodiments of the present disclosure relates to a soil analysis apparatus 100. Referring to FIG. 1 to FIG. 9, the soil analysis apparatus 100 (hereby referred to as "the apparatus 100") comprises an enclosure 10, a provision 11 20, at least one reservoir 20, a plurality of storage containers 21a, 21b, 21c, 102, a frame member 30, at least one pump 40, at least one robotic arm assembly 50 and a control unit 109.

The apparatus 100 is configured to test a soil solution to analyze properties and nutrients of the soil. Now referring to FIG. 1 to FIG. 4, the apparatus 100 comprises an enclosure 10 defining with a platform 12 which extends in a horizontal plane. Further, the platform 12 is bounded by a plurality of upstanding walls, such as an upper wall 13, side walls, and a front wall, covered by an upper wall 13. In an embodiment, the enclosure 10 may be defined with at least one opening to allow a user to access the components of the apparatus 100 arranged thereof. In an embodiment, the enclosure 10 is constructed and manufactured of durable material to provide support for heavier components of the apparatus 100.

Further, a provision 11 is defined in the upper wall 13 of the enclosure 10 for introducing a soil solution of the soil that is to be analysed. The at least one soil solution is received by at least one reservoir 20 to that stores the soil solution required for analyzing. The provision 11 is defined by an inlet opening to collect the soil solution. In an embodiment, the provision 11 may be a funnel or duct or vessel extending into the enclosure 10 and is intended to receive and transfer the soil solution to at least one reservoir 20. The provision 11 may comprise a removable lid (not shown in figures) to seal the provision 11 once the soil solution is received by the reservoir 20. In an embodiment, the soil solution may be directly introduced into a receptacle 60.

The reservoir 20 is substantially a closed container to store a pre-determined quantity of soil solution which is to be tested/analysed. The reservoir 20 is positioned beneath the provision 11 to receive the soil solution. Further, the reservoir 20 is in fluid communication with at least one pump 40 to dispense pre-determined quantity of the soil solution into the receptacle 60.

The apparatus 100 further includes a plurality of storage containers 21a, 21b, 21c, 102 that is supported and configured within the enclosure 10. Each of the plurality of storage containers 21a, 21b, 21c, 102 is configured to store at least one reagent solution in pre-determined quantity. In an embodiment, the apparatus 100 comprises an auxiliary reservoir 22 supported by the enclosure 10 to store distilled water.

In yet another embodiment of the present disclosure, the reagents that are stored in the plurality of storage containers 21a, 21b, 21c is selected from the group comprising ascorbic acid (CAS No. 50-81-7), Azomethine H GR for analysis (CAS No. 5941-07-1), Universal Indicator 10 Solution (S75017); Ammonium Metavanadate (<95 wt. %; CAS No. 7803-55-6), Sodium Hydroxide, Solid/Potassium Reagent A (95% to 100% Sodium Hydroxide—CAS No. 1310-73-2, and <3% Sodium Carbonate—CAS No. 497-19-8), Sodium Chloride/Potassium Reagent B (>95%; CAS No. 7647-14-5), Ammonium Molybdate Tetrahydrate (CAS No. 12054-85-2), Sodium 15 Tetraphenyl Boron (CAS No. 143-66-8); 1,10-Phenanthroline Monohydrate (CAS No. 5144-89-8), and Nitrate/Nitrite Test Kit. It will be appreciated by a person skilled in the art that reagents in solid or powder form are to be converted into appropriate solutions for dispensing.

In another embodiment of the present disclosure, the Universal Indicator Solution comprises: 62% Water (CAS No. 7732-18-5); 37% Ethyl Alcohol (CAS No. 64-17-5); 0.8% Methyl Alcohol (CAS No. 67-56-1), 0.03% Phenolphthalein, Disodium Salt (CAS No. 518-51-4); 0.03% Bromothymol Blue, Sodium Salt (CAS No. 34722-90-2); and 0.02% Methyl Red, Sodium Salt (CAS No. 845-10-3).

In yet another embodiment of the present disclosure, the Nitrate/Nitrite Test Kit comprises: 10% to 25% of 95-97% Sulphuric Acid (CAS No. 7664-93-9); 1% to 5% of stabilized Zinc Powder (<45 μm; CAS No. 7440-66-6); and 0.1% to 1% of Sulphanilic Acid (CAS No. 121-57-3).

The apparatus 100 further comprises a frame member 30 that is supported within the enclosure 10. In an embodiment, the frame member 30 is mounted to the upper wall 13 of the enclosure 10 and connected by a mechanical or thermal joining. The frame member 30 has a base member 31a and a pair of support member 31b positioned at opposite ends of the base member 31a, such that the pair of support member 31b extends from the base member 31a towards the upper wall 13 of the enclosure 10. The pair of support members 31a are defined with mounting provision 35 to facilitate mounting of the support member along with the base portion to the upper wall 13. In an embodiment, the mounting provision 35 may be a flange including mounting provision 35 that is configured to receive at least one fastener to mount the frame member 30 to the upper wall 13 of the enclosure 10. The plurality of mounting provisions may include at least one of threaded holes, an aperture, and any suitable mounting provision to receive at least one fastener.

Further, the frame member 30 is defined with a plurality of apertures 32, each configured to receive and support at least one of a plurality of dispensing pipes (not shown in figures). Each of the dispensing pipes are connected to each of the plurality of storage containers 21a, 21b, 21c, 102 at least one reservoir 20, and the auxiliary reservoir 22 to allow dispensing of predetermined quantity of the reagent solution, the soil solution and distilled water. The predetermined quantity of the reagent solution, the soil solution and distilled water is dispensed through a respective aperture 32 of the plurality of apertures 32 into the receptacle 60.

The apparatus 100 further includes at least one pump 40 in fluid communication with each of the plurality of the storage containers 21a, 21b, 21c, 102, the reservoir 20 and the plurality of dispensing pipes to dispense a predetermined quantity of the reagent solution and the soil solution through a respective aperture of the plurality of apertures 32 defined on the frame member 30. The apparatus 100 may comprise at least one auxiliary pump that is configured to supply one or more reagents external to the apparatus 100 via an auxiliary duct 34 to facilitate preparation of the soil solution. In an embodiment, the dispensing pipe and the auxiliary pipes is a clear transparent glass or plastic/silicon lab wear. In an embodiment, the pump 40 and the auxiliary pump is at least one of the peristaltic/diaphragm pumps. In an embodiment, each of the plurality of the storage containers 21a, 21b, 21c, 102 and auxiliary reservoir 22 is provided with at least one vent or valve. The at least one vent or valve creates an inlet for air that is required for dispensing/pumping the reagent solution and distilled water from plurality of the storage containers 21a, 21b, 21c, 102 and auxiliary reservoir 22, respectively. The provision of the at least one vent or valve allows entering of required amount of air into plurality of the storage containers 21a, 21b, 21c, 102 and auxiliary reservoir 22 that was pumped out of the plurality of the storage containers 21a, 21b, 21c, 102 and auxiliary reservoir 22 while dispensing the same during the testing. By providing at least one vent or valve to the plurality of the storage containers 21a, 21b, 21c, 102 and auxiliary reservoir 22 increases shelf life of reagent solution and the distilled water until put into use. In an embodiment, at least a portion of the frame member 30, particularly the base member 31a is defined with a reflective surface 33 such that the reflective surface 33 faces at least one robotic arm assembly 50. In an embodiment, the reflective surface 33 may be provided on any interior surface of the enclosure 10 apart from the frame member 30. The reflective surface 33 may be of a colour selected from the group comprising, white, black, blue, red, green and any suitable colour based on the user requirement. In an embodiment, the reflective surface 33 may be a coating of suitable colour or a sheet with required colour. In an embodiment, the sheet is coupled to the base member 31a of the frame member 30 by mechanical means such as fasteners or adhesives.

The apparatus 100 further includes at least one robotic arm assembly 50 mounted within the enclosure 10, to hold the receptacle 60. The receptacle 60 may be a clear transparent glass or plastic lab wear such as test tube, beaker, flask, bottle, and cylinder. The robotic assembly comprises a stand 51 mounted within the enclosure 10 to rigidly support the robotic arm assembly 50. The robotic assembly also includes a rotary unit 53 secured to the stand 51 for pivoting or rotating the robotic arm. The robotic arm 52 is pivotable about a first axis A and rotatable about a second axis B coinciding with a vertical axis of the robotic arm 52. In an embodiment, the rotary unit 53 may be a motor, hydraulic actuator, pneumatic actuator, and the like. The rotary unit 53 may be coupled to a mechanism through a belt drive or a pulley drive or a gear drive to enable rotation of robotic arm assembly 50. In another embodiment, the rotary unit 53 can be selected from the group consisting of DC motors, AC motors and servo motor. In an embodiment, the robotic arm 52 comprises a gripping means to removably hold the receptacle 60.

In an embodiment, the stand 51 may be movably attached to the enclosure 10 such that the robotic arm 52 can traverse in both horizontal and vertical direction within the enclosure 10. The stand 51 is movable in horizontal and vertical direction by means of slide guide rails, guide pillars or any suitable traversing means. In an embodiment, the stand 51 is driven by the rotary unit 53.

The apparatus 100 further includes the image capturing unit 104 to capture a set of images of the receptacle 60 against the reflective surfaces. The image capturing unit 104 may be secured on the robotic arm 52 or any portion of the robotic arm assembly 50 to capture the set of images of the receptacle 60. In another embodiment, the image capturing unit 104 may be secured below the receptacle 60 to capture the set of images of the receptacle 60. In yet another embodiment, the image capturing unit 104 is mounted to the frame member 30 or any position within the enclosure 10 to capture the set of images of the receptacle 60. The image capturing unit 104 is primarily a digital imaging device such as a camera. The image capturing unit 104 captures multiple images to analyse nutrient content and RGB values from the mixture of soil solution and reagent solution. This aids in eliminating a wait time of the mixture to capture the images and soil analysis. Moreover, the multiple images captured by image capturing unit 104 records a rate of the change of properties/colour/reaction of the mixture of soil solution and reagent solution without any waiting time.

In an embodiment, the apparatus 100 comprises a light source 105 that is positioned in the enclosure 10 to uniformly illuminate the receptacle 60 thereby facilitating to capture set of images of the receptacle 60. The light source 105 may be secured on the stand 51 or within the stand 51 of the robotic arm assembly 50, more specifically, below the receptacle 60 to provide uniform illumination. In an embodiment, the light source may be mounted within the enclosure 10 at any position to illuminate the receptacle 60. In an embodiment, the light source 105 is an LED.

The apparatus 100 also includes a residue collection unit 90 that is supported in the enclosure 10 to receive a mixture of soil solution and reagent solution. In an embodiment, the residue collection unit 90 includes a filter to separate a residue from the mixture of the soil solution and the reagent solution. The filter is at least one of activated carbon layer that facilities effective filtering of the residue from the mixture. This filtering facilitates the removal of harmful materials from the mixture before disposing the mixture in environment.

Further, the apparatus 100 includes a control unit 109 that is communicatively coupled to the robotic arm assembly 50 and at least one pump 40 to control and monitor the actuation of the robotic arm assembly 50 and the pump 40. The control unit 109 actuates at least one pump 40 to supply the predetermined quantity of the reagent solution and the soil solution in the receptacle 60 through the respective aperture of the plurality of apertures 32 of the frame member 30. The control unit 109 facilitates traversal of the robotic arm 52 holding receptacle 60 to receive the soil solution and reagents solution dispensed through respective dispensing pipes of the plurality of the dispensing pipes. Further, the control unit 109 is configured to selectively actuate the robotic arm assembly 50 to traverse the receptacle 60 within the enclosure 10. More specifically, the control enables the rotary unit 53 to further actuate and perform pivoting of the robotic arm 52 about the first axis A and rotation of the robotic arm 52 about the second axis B coinciding with the vertical axis of the robotic arm. Additionally, the control unit 109 may enable the rotary unit 53 to actuate and perform the horizontal and vertical traverse of the robotic arm assembly 50.

The control unit 109 actuates the rotary unit 53 to rotate the robotic arm 52 to perform a mixing operation for obtaining the mixture of soil solution and reagent solution. Also, the control unit 109 actuates the rotary unit 53 to pivot the robotic arm 52 and thereby performing a dispensing operation to dispense the mixture of soil solution and reagent solution. Further, the control unit 109 actuates the robotic arm 52 to position the receptacle 60 containing the mixture about the reflective surface 33 to allow capturing of set of images by the image capturing unit 104. Furthermore, the control unit 109 enables cleaning of the receptacle 60 by receiving a predetermined quantity of distilled water from the auxiliary reservoir. Subsequently, the mixing operation is performed to thoroughly clean the receptacle 60 and the control unit 109 actuates the rotary unit 53 to pivot the robotic arm and thereby performing the dispensing operation to dispense the mixed distilled water into the residue collection unit 90. In an embodiment, the control unit 109 enables cleaning of the plurality of dispensing pipes and auxiliary duct 34 by receiving a predetermined quantity of distilled water from the auxiliary reservoir via at least one pump 40 and auxiliary pump, respectively. In an embodiment, the control unit enables cleaning of the reservoir 20, such that by receiving a predetermined quantity of distilled water from the auxiliary reservoir via at least one pump 40.

The control unit 109 comprises, a processor 110 and a memory unit 106 is communicatively coupled to the processor. The processors can be implemented as one or more microprocessors, microcomputers, microcontrollers, digital signal processors, central processing units, state machines, logic circuitries, and/or any devices that manipulate signals based on operational instructions. The memory unit 106 stores processor-executable instructions, which, on execution, causes the processor to receive one or more command signals associated with the user inputs from a user interface unit 107 of the apparatus 100. In an embodiment, the user interface unit 107 is coupled to the control unit 109 to receive inputs from the user to perform testing of the soil solution. The inputs received from the user include, but are not limited to, a login credentials such as username and password, produce type, mobile number, area of the land, location of the land, types of soil, types of testing, selection of reagent solution, quantity of reagents solution, dispensing water, and soil solution, time and any essential details that are required to perform soil analysis. In an embodiment can be an input/output device to display graphical information related to soil analysis. The user interface unit 107 displays an indication with respect to quantities of reagent solution, soil solution and distilled water to the user to facilitate refilling of each of the reagent solution, soil solution and distilled water in the required quantities.

In yet another embodiment of the present disclosure, the user interface unit 107 can include a variety of software and hardware interfaces, for example, a web interface, a graphical user interface 107, and the like.

Further, the apparatus 100 includes a communication module that facilitates the interaction of the apparatus 100 with an application installable on a computing device, through which an operation of the apparatus 100 may be configured and controlled remotely. In an embodiment, the computing device includes, but is not limited to laptop computer, a desktop computer, a notebook, a workstation, a mainframe computer, a server, a network server, cloud, hand-held device, wearable device and the like. The communication of the apparatus 100 with the computing device may occur through a wide variety of networks and protocol types, including wired networks, for example, LAN, cable, etc., and wireless networks, such as WLAN, cellular, or satellite. In an embodiment, the communication may occur via Bluetooth Low Energy, LoRa, ZigBee, and the like. In an embodiment, a display of the computing device may also function as the user interface unit 107.

Based on one or more commands signals command received from the user interface 107, the control unit 109 actuates robotic arm assembly 50 holding the receptacle 60 to traverse within the enclosure 10 about the frame member 30. Further, at least one pump 40 is activated to supply the predetermined quantity of soil solution from the reservoir and one or more reagent solution from each of the plurality of storage containers 21*a*, 21*b*, 21*c*, 102 via dispensing pipes. Subsequently, the robotic arm assembly 50 is actuated to perform a mixing operation to obtain the mixture of soil solution and reagent solution and position the receptacle 60 about the reflective surface 33. Further, one or more command signals are provided to the light source 105 coupled with the control unit 109 for illuminating the receptacle 60 positioned about the reflective surface 33. Later, one or more command signals are provided to the image capturing unit 104 coupled to the control unit 109, to capture a set of images of the receptacle 60 against the reflective surfaces 33. The reflective surfaces 33 receives light from the light source 105 and reflects the light to illuminate the receptacle 60 to allow the image capturing to capture the set of images of the mixture of the soil solution and the reagent solution to determine an RGB value and a nutrition content of soil. The control unit 109 receives the set of images from the image capturing unit 104. Further, one or more parameters including an RGB value, nutrient content of the soil, time and quantity are determined by comparing at least one image received from the image capturing unit 104 with the standard calibrated images stored in a data repository. In an embodiment, the data repository is coupled with the image capturing unit 104. The data repository is configured to store one or more set of images captured by the image capturing unit 104 and standard calibration images. In an embodiment, the date repository may be store at least one knowledge base data on the cloud. While an at least one of refined, fine-tuned, minimalistic, compressed, pruned version of the at least one extensive data, is stored on the at least one control unit 109. The at least one knowledge base on the cloud syncs at regular, periodic intervals with the at least one control unit 109 and is configured to learn and improve itself based on the data received continuously from the control unit 109.

The control unit 109 generates one or more reports including information associated with the RGB values, nutrient content, one or more recommendations of follow-up test procedures to be conducted. Further, an analysis opinion is provided based on RGB value and the nutrient content thus determined and displayed on the user interface unit 107.

The apparatus 100 further includes a power source 80 to supply power to the control, pumps 40, rotary unit 53 image capturing unit 104, and the light source 105. In an embodiment, the power source 80 may be at least one of electrical supply, battery powered or solar.

In an embodiment, the soil solution analysis includes various test, but is not limited to, Nitrogen, Phosphorous, Potassium, Electrical Conductivity, pH, Ammonia, Boron, Manganese, Sulphur, Iron, Copper, Zinc, Magnesium, Calcium, and Microbial Activity

EXAMPLES

Various embodiments of the method of operation of the apparatus 100 shall now be explained. It will be appreciated by a person skilled in the art that the embodiments described below are non-limiting. Various modifications, additions, alterations, and improvements may be made by a person skilled in the art and are to be construed as being within the scope of this disclosure.

Soil Sample Solution Preparation:

The general method of preparing a soil solution that is to be subjected to analysis shall now be explained. A soil sample is collected and allowed to dry under the sun for about 10 minutes. The soil sample solution is made by taking 10 ml dry soil in a beaker. 50 ml of an extraction solution is collected in the beaker through the auxiliary duct 34, based on the user inputs via user interface unit 107. The solution is shaken thoroughly and allowed to sit for about 10 minutes until all the soil settles at the bottom. Further, an inverted cone is formed with a filter paper of about 25 microns and the soil solution is filtered through the inverted cone to obtain a particle-free soil solution.

For Testing of Electrical Conductivity

The electrical conductivity testing of soil is performed by taking about 20 grams of dry soil is in a beaker. Further, a 40 ml of distilled water is collected in the beaker through the auxiliary duct 34, based on the user inputs via user interface 107. The dispensing of the distilled water occurs by selecting the respective test through the user interface 107 by the user or operator. The solution collected in the beaker is shaken well for about thirty minutes.

For Testing of pH

For the testing of pH of the soil, about 30 grams of dry soil is taken in a beaker and 75 ml of extraction solution is collected in the beaker through the auxiliary duct 34. The dispensing of the extraction solution occurs automatically by selecting the respective test through the user interface unit 107 by the user or operator. The solution is shaken well for about sixty minutes.

Testing of Electrical Conductivity:

The testing of Electrical Conductivity shall now be explained. In an embodiment, any commercially available electrical conductivity probe may be used. Further, an analog circuit disposed in the at least one control unit 109 produces a square wave AC waveform across the electrical conductivity probe, whose frequency is proportional to the resistance of the soil solution in which the electrical conductivity probe is immersed. The time period of the waveform is measured by the at least one control unit 109. Then, the conductivity is calculated. The temperature of the soil sample solution is calculated by the control unit 109 through a temperature sensor, which is built into the electrical conductivity probe, following which temperature compensation is performed.

Testing of pH:

The testing of pH shall now be explained. Through the user interface unit 107, the user is instructed to dip a pH probe into the obtained the soil solution, which has been prepared as explained above. Any commercially available pH probe may be used. The pH probe produces a voltage, which is proportional to the pH of the soil sample solution. The analog circuit present in the control unit 109 acts as a buffer and boosts the signal. The boosted signal is measured through an Analog to Digital Converter that is disposed in the at least one control unit 109. The temperature of the solution is calculated through the temperature sensor by the at least one control unit 109. The pH is calculated based on the temperature and the voltage of the pH probe.

Testing of Nitrogen:

The testing of Nitrogen shall now be explained. When the respective test is selected through the user interface unit 107 by the at user or operator. The receptacle 60 is initially cleaned through by distilled water. The robotic arm assembly 50 holding the receptacle 60 traverses towards the frame member 30 having the dispensing pipe. The receptacle 60 receives 15 ml of distilled water from the dispensing pipe connected auxiliary reservoir via at least one pump 40. Subsequently, the robotic arm assembly 50 rotates the receptacle 60 for performing mixing operation to thoroughly clean the receptacle 60. The robotic arm assembly 50 pivots to perform the dispensing operation to dispose washed water into the residue collection unit 90. Then the receptacle 60 traverses to the frame structure via the robotic arm assembly 50 to receive the soil solution and reagents solution through respective dispensing pipes of the plurality of dispensing pipes. The robotic arm 52 performs the mixing operation to obtain the mixture of soil solution and the reagent solution. Subsequently, the user interface unit 107 instructs the user to introduce the prepared sample solution through the provision 11. The introduced soil solution is collected and stored in the sample solution chamber. Further, a 5 ml of the received and stored solution is dispensed into the receptacle 60 for the mixing and soil solution and reagent solution. Then, the user interface unit 107 instructs the user to collect distilled water through the dispensing pipes. Two tablets (commercially available Nitrate A and Nitrate B tablets) are added to the collected distilled water and mixed well. Upon display of the respective instructive on the interface, the user or operator introduces the soil solution through the provision 11 into the receptacle 60. The receptacle 60 having for the mixing of soil solution and reagent solution is rotated to perform mixing operation the robotic arm assembly 50 and the receptacle 60 is kept idle for about six minutes, following which at least one image is captured by the at least one image capturing unit 104 such that the receptacle 60 is illuminated by the light source 105 and is positioned about the reflective surface 33 of the frame member 30. The captured image is compared with standard calibration images that are stored in the data repository and/or the cloud. Thus, the content of Nitrogen is calculated by interpolation or extrapolation. The calculated content is saved on the knowledge base/cloud and is displayed through the user interface unit 107. After calculation, the mixture is dispensed into the residue collection unit 90.

Testing of Phosphorous:

When the respective test is selected through the user interface unit 107 by the at user or operator. The receptacle 60 is initially cleaned through by distilled water. The robotic arm assembly 50 holding the receptacle 60 traverses towards the frame member 30 having the dispensing pipe. The receptacle 60 receives 15 ml of distilled water from the dispensing pipe connected auxiliary reservoir via at least one pump 40. Subsequently, the robotic arm assembly 50 rotates the receptacle 60 for performing mixing operation to thoroughly clean the receptacle 60. The robotic arm assembly 50 pivots to perform the dispensing operation to dispense the washed water into the residue collection unit 90. Then the receptacle 60 traversed to the frame structure via the robotic arm assembly 50 to receive the soil solution and reagents solution through respective dispensing pipes of the plurality of dispensing pipes. 2 ml of soil solution and 8 ml of distilled water are dispensed into the receptacle 60 and 5 reagents are received through the plurality of dispensing pipes. Five drops of Ammonium Molybdate Tetrahydrate are also dispensed into the receptacle 60 to be the mixing with the soil solution and reagents solution through the dispensing pipes. The robotic arm 52 performs the mixing operation to obtain the mixture of soil solution and the reagent solution. Further, by the robotic arm assembly 50 is kept idle for about five minutes, following which at least one image is captured by the at least one image capturing unit 104 such that the receptacle 60 is illuminated by the light source 105 and is positioned about the reflective surface 33 of the frame member 30 is having colour white. The captured image is compared with standard calibration images that are stored in the data repository and/or the cloud. Thus, the content of phosphorous is calculated by interpolation or extrapolation of the RGB value by comparing with captured image with standard calibrated data is calculated. Further, the nutrient content is saved on the knowledge base/cloud and is displayed through the user interface unit 107. After calculation, the mixture is dispensed into the residue collection unit 90.

Testing of Potassium:

The testing of Potassium shall now be explained. When the respective test is selected through the user interface unit 107 by the at user or operator. The receptacle 60 is initially cleaned through by distilled water. The robotic arm assembly 50 holding the receptacle 60 traverses towards the frame member 30 having the dispensing pipe. The receptacle 60 receives 15 ml of distilled water from the dispensing pipe connected auxiliary reservoir via at least one pump 40. Subsequently, the robotic arm assembly 50 rotates the receptacle 60 for performing mixing operation to thoroughly clean the receptacle 60. The robotic arm assembly 50 pivots to perform the dispensing operation to dispense the washed water into the residue collection unit 90. Then the receptacle 60 traversed to the frame structure via the robotic arm assembly 50 to receive the soil solution and reagents solution through respective dispensing pipes of the plurality of dispensing pipes. 5 ml of soil solution and 5 ml of distilled water are dispensed into the receptacle 60 through the plurality of dispensing pipes. Five drops of Potassium Reagent A and Ten drops of the potassium reagent B are dispensed into receptacle 60 the. The robotic arm 52 performs the mixing operation to obtain the mixture of soil solution and the reagent solution. Further, by the robotic arm assembly 50 is kept idle for about 10 minutes, following which at least one image is captured by the at least one image capturing unit 104 such that the receptacle 60 is illuminated by the light source 105 and is positioned about the reflective surface 33 of the frame member 30 having blue colour. The captured image is compared with standard calibration images that are stored in the data repository and/or the cloud. Thus, the content of available Potassium is calculated by interpolation or extrapolation and the RGB value is calculated by comparing the captured image with standard calibrated data. The calculated nutrient content of the soil is saved on the knowledge base/cloud and is displayed through the user interface unit 107. After calculation, the mixture is dispensed into the residue collection unit 90.

Along similar lines, tests may be performed for Ammonia, Boron, Manganese, Sulphur, Iron, Copper, Zinc, Magnesium, and Calcium.

In an embodiment, types of tests can be performed by the apparatus 100 of the present disclosure such as ordinary standard chemical process, titration, and turbulence check.

In standard chemical process, the soil sample solution is mixed with reagent solution and image captured by the image capturing unit 104 against the reflective surfaces 33. Depending on the RGB value calculated based on the image captured, the nutrition content of the soil is analysed and displayed on the user interface unit 107. In titration test, reagents are mixed with the soil sample solution drop by drop wise into the receptacle 60 via pumps 40 and colour is sensed by image capturing unit 104. When the colour of the solution changes to particular RGB values, the total quantity of reagent dispensed is calculated and depending on quantity the soil nutrient is calculated and displayed on the user interface unit 107.

In turbulence type of test, the soil sample solution is mixed with reagents and colour is sensed using image capturing unit 104 such that the images are taken under some reflective surface 33 background like Blue/Black. Depending on the RGB value calculated based on the image captured, the nutrition content of the soil is analysed and displayed on the user interface unit 107.

The difference between ordinary process and turbulence check is only the colour of the reflective surface 33.

In one example, a sample calibration data stored in the data repository is illustrated in the below table.

| Test | RGB | Value |
|---|---|---|
| Nitrogen | 132 120 80 | 0 mg/kg |
| Nitrogen | 182 69 123 | 5 mg/kg |
| Nitrogen | 219 54 168 | 10 mg/kg |
| Nitrogen | 238 31 165 | 20 mg/kg |
| Nitrogen | 243 9 139 | 30 mg/kg |
| Nitrogen | 249 1 147 | 40 mg/kg |
| Phosphorus | 155 137 89 | 0 mg/kg |
| Phosphorus | 163 142 75 | 5 mg/kg |
| Phosphorus | 165 141 36 | 10 mg/kg |
| Phosphorus | 173 149 29 | 15 mg/kg |
| Phosphorus | 168 146 10 | 20 mg/kg |
| Phosphorus | 173 137 0 | 25 mg/kg |
| Potassium | 137 137 137 | 0 mg/kg |
| Potassium | 147 147 147 | 10 mg/kg |
| Potassium | 154 154 154 | 20 mg/kg |
| Potassium | 159 159 159 | 40 mg/kg |

Figure 5:
FIG. 5 illustrates an image that is captured by at least one image capturing unit, in accordance with an embodiment of the present disclosure.
Figure 6:
FIG. 6 illustrates an image that is captured by at least one image capturing unit, in accordance with an embodiment of the present disclosure.
Figure 7:
FIG. 7 illustrates an image that is captured by at least one image capturing unit, in accordance with an embodiment of the present disclosure.
Figure 8:
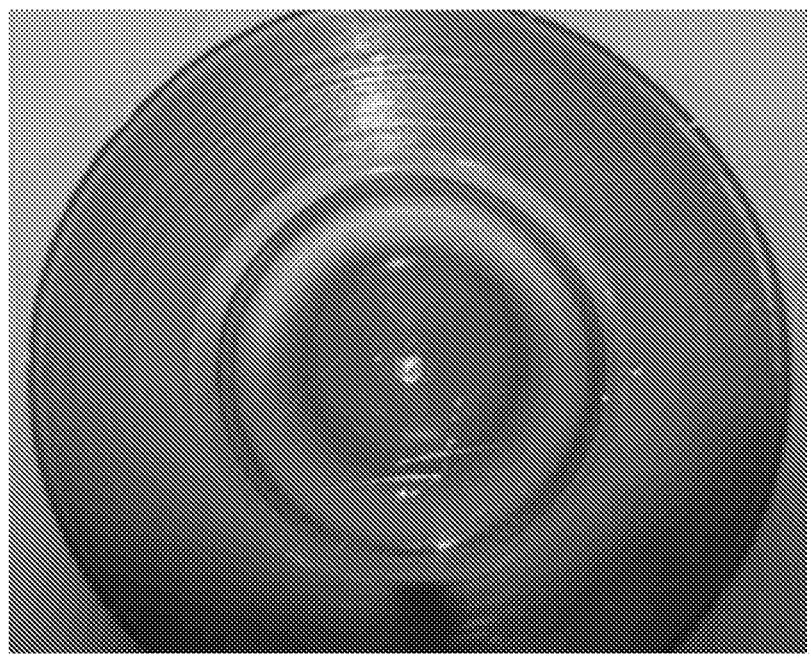
FIG. 8 illustrates an image that is captured by at least one image capturing unit, in accordance with an embodiment of the present disclosure.
Figure 9:
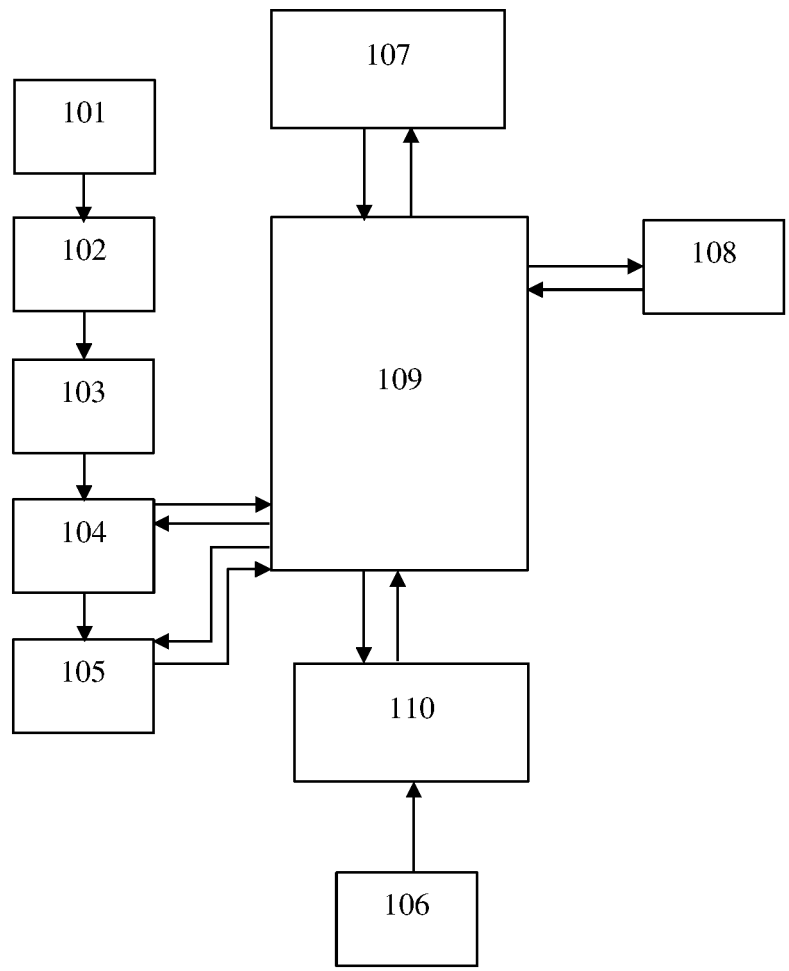
FIG. 9 illustrates a block diagram of the apparatus, in accordance with an embodiment of the present disclosure.

FIG. 5 to FIG. 8 illustrates the different images captures by the image capturing unit to analyse the nutrients within the soil and RGB value. FIG. 5 and FIG. 6 illustrates the image captures with respect to Potassium testing. FIG. 7 illustrates the image captures with respect to nitrate testing. FIG. 8 illustrates the image captures with respect to phosphorus testing.

It is to be understood that the aspects and embodiments of the disclosure described above may be used in any combination with each other. Several of the aspects and embodiments may be combined together to form a further embodiment of the disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

In the detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

In an embodiment, the present disclosure provides a soil analysis apparatus 100 which provides a real time soil analysis.

The present disclosure provides a soil analysis apparatus 100 that is simple, easy to operate and affordable.

The apparatus 100 according to the present disclosure is easy to operate and inexpensive to manufacture.

The apparatus 100 of the present disclosure minimises time, human intervention and provides accurate results.

The apparatus 100 of the present disclosure provides accurate results by eliminating errors such as manual testing and inspection.

The apparatus 100 of the present disclosure provides reports of the soil analysis to allow a user to know the appropriate fertilizers or other growth stimulating agents that may be required to enhance the soil properties to produce yields.

The apparatus 100 of the present disclosure facilitates periodic monitoring of soil nutrient contents and properties, thereby leading to identification of soil degradation in advance and allows taking of corrective action in advance.

The apparatus 100 of the present disclosure eliminates the disposal of harmful residue into the environment.

The apparatus 100 of the present disclosure can be applicable for water testing, healthcare industries, chemical industries, pharma industries and any other industry depending the upon the application.

EQUIVALENTS

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Apparatus |
| 10 | Enclosure |
| 11 | Provision |
| 12 | Platform |
| 20 | Reservoir |
| 21a, 21b, 21c | Storage containers |
| 22 | Auxiliary reservoir |
| 30 | Frame member |
| 31a | Base portion |
| 31b | Side Portion |
| 32 | Apertures |
| 33 | Reflective surface |
| 34 | Auxiliary duct |
| 35 | Mounting provision |
| 40 | Pumps |
| 50 | Robotic arm assembly |
| 51 | Stand |
| 52 | Robotic arm |
| 53 | Rotary unit |
| 80 | Power source |
| 90 | Residue collection unit |
| 109 | Control unit |
| 108 | Data repository |
| 107 | User interface |
| 106 | Memory unit |
| 105 | Light source |
| 104 | Image capturing unit |
| 103 | Robotic arm assembly |
| 102 | Storage containers |
| 101 | Reservoir |
| A | First axis |
| B | Second axis |

The invention claimed is:

1. A soil analysis apparatus (100), comprising:
   an enclosure (10) defining a platform;
   a provision (11) defined in an upper wall (13) of the enclosure (10) for introducing a soil solution of the soil to be analysed;
   at least one reservoir (20,101) to receive and store the soil solution;
   a plurality of storage containers (21a, 21b, 21c, 102) supported by the enclosure (10), each configured to store at least one reagent solution;
   a frame member (30) supported within the enclosure (10), the frame member (30) is defined with a plurality of apertures, each configured to support at least one of a plurality of dispensing pipes, wherein at least a portion of the frame member (30) is configured as a reflective surface (33);
   at least one pump (40) in fluid communication with each of the plurality of the storage containers (21a, 21b, 21c, 102), the reservoir (20,101) and the plurality of dispensing pipes to dispense a predetermined quantity of the reagent solution and the soil solution through a respective aperture of the plurality of apertures (32) into a receptacle (60);
   at least one robotic arm assembly (50) mounted within the enclosure (10), wherein the robotic arm assembly (50) is configured to hold the receptacle (60);
   a control unit (109) communicatively coupled to the robotic assembly (50) and at least one pump (40), wherein the control unit (109) is configured to actuate the pump (40) to supply the predetermined quantity of the reagent solution and the soil solution into the receptacle (60) through the respective aperture of the plurality of apertures (32) of the frame member (30), and wherein, the control unit (109) is configured to selectively actuate the robotic arm assembly (50) to traverse the receptacle (60) within the enclosure (10) to receive the soil solution and reagents solution dispensed through the plurality of the dispensing pipes, and to perform a mixing operation to obtain a mixture of soil solution and reagent solution and to position the receptacle (60) about the reflective surface (33); and an image capturing unit (104) positioned within the enclosure (10), wherein the image capturing unit (104) is configured to capture images of the mixture of the soil solution and the reagent solution in the receptacle (60) against the reflective surfaces (33).

2. The soil analysis apparatus (100) as claimed in claim 1, further comprising a user interface unit (107) coupled with the control unit (109) to receive inputs from user to perform the perform testing of the soil solution, and wherein the user interface unit (107) displays outputs to the user.

3. The soil analysis apparatus (100) as claimed in claim 1, further comprising a residue collection unit (90) supported in the enclosure (10) to receive the mixture of soil solution and reagent solution.

4. The soil analysis apparatus (100) as claimed in claim 3, wherein the residue collection unit (90) includes a filter to separate a residue from the mixture of the soil solution and the reagent solution.

5. The soil analysis apparatus (100) as claimed in claim 3, wherein the robotic assembly (50) is configured to dispense the mixture of the soil solution and the reagent solution in the receptacle (60) into the residue collection unit (90).

6. The soil analysis apparatus (100) as claimed in claim 1, further comprising an auxiliary reservoir (22) to store distilled water.

7. The soil analysis apparatus 100 as claimed in claim 1, wherein the control unit 109 coupled to the robotic arm assembly 50 is configured to actuate the robotic assembly to receive a predetermined quantity of distilled water to clean the receptacle 60 before receiving the soil solution.

8. The soil analysis apparatus (100) as claimed in claim 1, further comprising a light source (105) positioned in the enclosure 10, wherein the light source (105) is configured to illuminate the receptacle (60).

9. The soil analysis apparatus (100) as claimed in claim 1, wherein the robotic assembly (50) comprises;
a stand (51) mounted within the enclosure (10);
a robotic arm (52) coupled to the stand (51), to hold the receptacle (60); and
a rotary unit (53) secured to the stand (51) for pivoting and rotating the robotic arm (52) about a first axis (A) and a second axis (B) respectively, wherein the second axis (B) coincides with a vertical axis of the robotic arm (52).

10. The soil analysis apparatus (100) as claimed in claim 1, wherein the reflective surfaces (33) is configured to receive light from the light source (105) and reflect the light to illuminate the receptacle (60) to allow the image capturing to capture the set of images of the mixture of the soil solution and the reagent solution to determine an RGB value and a nutrition content of soil.

11. The soil analysis apparatus (100) as claimed in claim 1, wherein at least one pump (40) is configured to supply one or more reagents external to the apparatus (100) via an auxiliary duct (34) to facilitate preparation of the soil solution.

12. The soil analysis apparatus (100) as claimed in claim 1, wherein the image capturing unit (104) is secured on the robotic arm assembly (50) or mounted to the upper wall (13) of the enclosure (10) to capture a set of images of the receptacle (60).

13. The soil analysis apparatus 100 as claimed in claim 1, further comprising a data repository (108) coupled with the image capturing unit (104), wherein the data repository (108) is configured to store one or more set of images captured by the image capturing unit (104) and standard calibration images.

14. The soil analysis apparatus (100) as claimed in claim 1, wherein the control unit (109) comprises;
a processor (110); and
a memory unit (106) communicatively coupled to the processor, wherein the memory unit (106) stores processor-executable instructions, which, on execution, causes the processor to:
receive one or more command signals associated with the user inputs from the user interface unit (107);
actuate robotic arm assembly (50) to traverse within the enclosure (10);
actuate at least one pump (40) to supply the predetermined quantity of soil solution from the reservoir (20,101) and one or more reagent solution from each of the plurality of storage containers (21*a*, 21*b*, 21*c*, 102) via dispensing pipes;
actuate the robotic arm assembly (50) to perform mixing operation to obtain the mixture of soil solution and reagent solution and position the receptacle (60) about the reflective surface (33);
generate one or more command signals to the light source (105) for illuminating the receptacle (60) positioned about the reflective surface (33);
generate one or more command signals to the image capturing unit (104) for capturing at least one image of the receptacle (60) against the reflective surfaces (33);
receive at least one image from the image capturing unit (104);
determine one or more parameters including an RGB value and nutrient content by comparing at least one image received from the image capturing unit (104) with standard calibrated images stored in the memory unit (106);
generate one or more reports including information associated with the RGB values, nutrient content, one or more recommendations of follow-up test procedures, time to be conducted and analysis opinion provided based on RGB value and the nutrient content thus determined; and
display one or more reports via the user interface unit (107).

15. The soil analysis apparatus (100) as claimed in claim 1, further comprising a power source (80) source to supply power to the control unit (109), pumps (40), rotary unit (53) image capturing unit (104), and the light source (105).

* * * * *